United States Patent [19]
Piorkowski

[11] Patent Number: 5,791,379
[45] Date of Patent: Aug. 11, 1998

[54] PIPE CAGE

[76] Inventor: Michael J. Piorkowski, 100 Gradyville Rd., Glen Mills, Pa. 19342

[21] Appl. No.: 862,760

[22] Filed: May 23, 1997

[51] Int. Cl.$^6$ .................................................. F16L 57/00
[52] U.S. Cl. ........................ 138/110; 138/112; 138/113; 138/168; 138/178
[58] Field of Search ................................ 138/110, 113, 138/178, 177, 106, 107, 118.1, 168, DIG. 11, 112, 117, 161, 1

[56] References Cited

U.S. PATENT DOCUMENTS

| | | |
|---|---|---|
| 2,646,818 | 7/1953 | Bimpson . |
| 2,804,095 | 8/1957 | Schauenburg .................. 138/107 |
| 2,914,090 | 11/1959 | Isenberg ........................ 138/113 |
| 2,962,051 | 11/1960 | Burkes, Jr. .................... 138/177 |
| 3,889,715 | 6/1975 | Lilja et al. .................... 138/149 |
| 4,061,312 | 12/1977 | Walchuk . |
| 4,147,186 | 4/1979 | Harting et al. ................. 138/161 |
| 4,373,998 | 2/1983 | Herrick et al. . |
| 4,603,737 | 8/1986 | Spikes ........................... 138/110 |
| 4,667,702 | 5/1987 | Roth ............................. 138/168 |
| 4,911,206 | 3/1990 | Gropp et al. ................... 138/110 |
| 5,303,744 | 4/1994 | Eriksson ........................ 138/110 |
| 5,368,338 | 11/1994 | Greene et al. . |
| 5,402,830 | 4/1995 | Dortzbach ...................... 138/110 |

*Primary Examiner*—David Scherbel
*Assistant Examiner*—James F. Hook
*Attorney, Agent, or Firm*—Michael I. Kroll

[57] ABSTRACT

A pipe cage (18) for protecting persons from a hot process pipe (12). The pipe cage includes first and second clips (20,22) separated by a predetermined distance and engaging the hot process pipe (12) and first and second sets of spacer bars (24,26) extending from a respective one of the first and second clips (20,22). A first ring (28) is connected to surround the first set of bars (24) and a second ring (30) is connected to surround the second set of spacer bars (26). A plurality of ribs (32) are connected between the first and second rings (28,30), wherein the plurality of ribs (32) are spaced from and extend parallel to the hot process pipe (12) preventing contact of the hot process pipe (12) by a person in an area surrounding the pipe while providing ambient air exposure to the hot process pipe (12).

11 Claims, 4 Drawing Sheets

PIPE CAGE

BACKGROUND OF THE INVENTION

1. Field of the Invention

The instant invention relates generally to hot process piping and process vessels and, more specifically, to protection and isolation of persons from contacting the hot process piping and process vessels.

2. Description of the prior Art

Numerous devices for isolating hot process piping have been provided in the prior art. For example, U.S. Pat. Nos. 2,646,818; 4,061,312; 4,373,998 and 5,368,338 all are illustrative of such prior art While these units may be suitable for the particular purpose to which they address, they would not be as suitable for the purposes of the present invention as heretofore described.

U.S. Pat. No. 2,646,818

Inventor: Henry S. Bimpson

Issued: Jul. 28, 1953

This invention relates to means for protecting the outer surface of tubular conduits. More particularly this invention relates to means for protecting the outer surfaces of tubular conduits that are subjected to erosive wear of materials passing over them, as for example, in a steam surface condenser where drops of water traveling at high velocity tend to erode the condenser tubes.

U.S. Pat. No. 4,061,312

Inventor: Thomas S. Walchuk

Issued: Dec. 6,1977

A method is disclosed for protecting assembled wheel move irrigation systems from being damaged by cattle grazing in a field where such a system is located, which includes the clamping of an insulator utilizing an overcenter clamping arrangement on the rim of each ground-engaging wheel of the system and electrifying a wire strung along the length of the system and supported by a wire-engaging means on the face of each clamp-on insulator.

U.S. Pat. No. 4,373,998

Inventor: Earl C. Hetrick et al.

Issued: Feb. 15,1983

A heat shield for hot vertical pipes and, in particular, coke oven ascension pipes. This heat shield includes a lower, open-bottomed cylindrical housing section which peripherally encloses the pipe. Vertically projecting from this housing is an arcuate wall which is spaced from the pipe. The housing is internally partitioned into a warmer space adjacent the pipe and a cooler space remote from the pipe so that a heat dissipating upward draft is established in the housing and between the pipe and the vertical arcuate wall.

U.S. Pat. No. 5,368,338

Inventor: Karen C. Greene et al.

Issued: Nov. 29,1994

A containment interlocking union for use with a containment pipe which encloses a carrier pipe. The containment interlocking union is placed in position around a coupling in the carrier pipe. The interlocking union includes a first joint member and a second joint member positioned circumferentially adjacent to each other and coupled to the containment pipe. The first joint member comprises a first coupling portion of a major radius sealably engaging an outer circumferential surface of an end of the double containment pipe, a pair of second coupling portions of a minor radius adjacent the first coupling portion providing a pair of flanges abutting the ends of the carrier pipe coupling providing longitudinal support of the carrier pipe coupling, and a third coupling portion of an intermediate radius adjacent the second coupling portion.

SUMMARY OF THE INVENTION

The present invention is concerned with hot process piping and process vessels and, more specifically, to protecting and isolating persons from contact with the hot process piping and process vessels.

A primary object of the present invention is to provide a pipe cage that will overcome the shortcomings of the prior art devices.

Another object of the present invention is to provide a pipe cage able to protect persons from contact with hot process piping and process vessels.

A further object of the present invention is to provide a pipe cage which will not obstruct exposure of the hot process piping and process vessels to the atmosphere.

A still further object of the present invention is to provide a pipe cage which will allow ambient air to cool the hot process piping and process vessels.

A yet further object of the present invention is to provide a pipe cage which increases the efficiency and production of hot process piping and process vessels.

A still further object of the present invention is to provide a pipe cage which allows easy access for maintenance and inspection of the hot process piping and process vessels.

An additional object of the present invention is to provide a pipe cage which is easily installed.

An even further object of the present invention is to provide a pipe cage which is inexpensive in cost.

A pipe cage for protecting persons from a hot process pipe is disclosed by the present invention. The pipe cage includes first and second clips separated by a predetermined distance for engaging the hot process pipe and first and second sets of spacer bars extending from a respective one of the first and second clips. A first ring is connected to surround the first set of spacer bars and a second ring is connected to surround the second set of spacer bars. A plurality of ribs are connected between the first and second rings, wherein the plurality of ribs are spaced from and extend parallel to the hot process pipe preventing contact of the hot process pipe by a person in an area surrounding the pipe while providing ambient air exposure to the hot process pipe.

The foregoing and other objects, advantages and characterizing features will become apparent from the following description of certain illustrative embodiments of the invention.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings. Attention is called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

LIST OF REFERENCE NUMBERS

Figure 1:
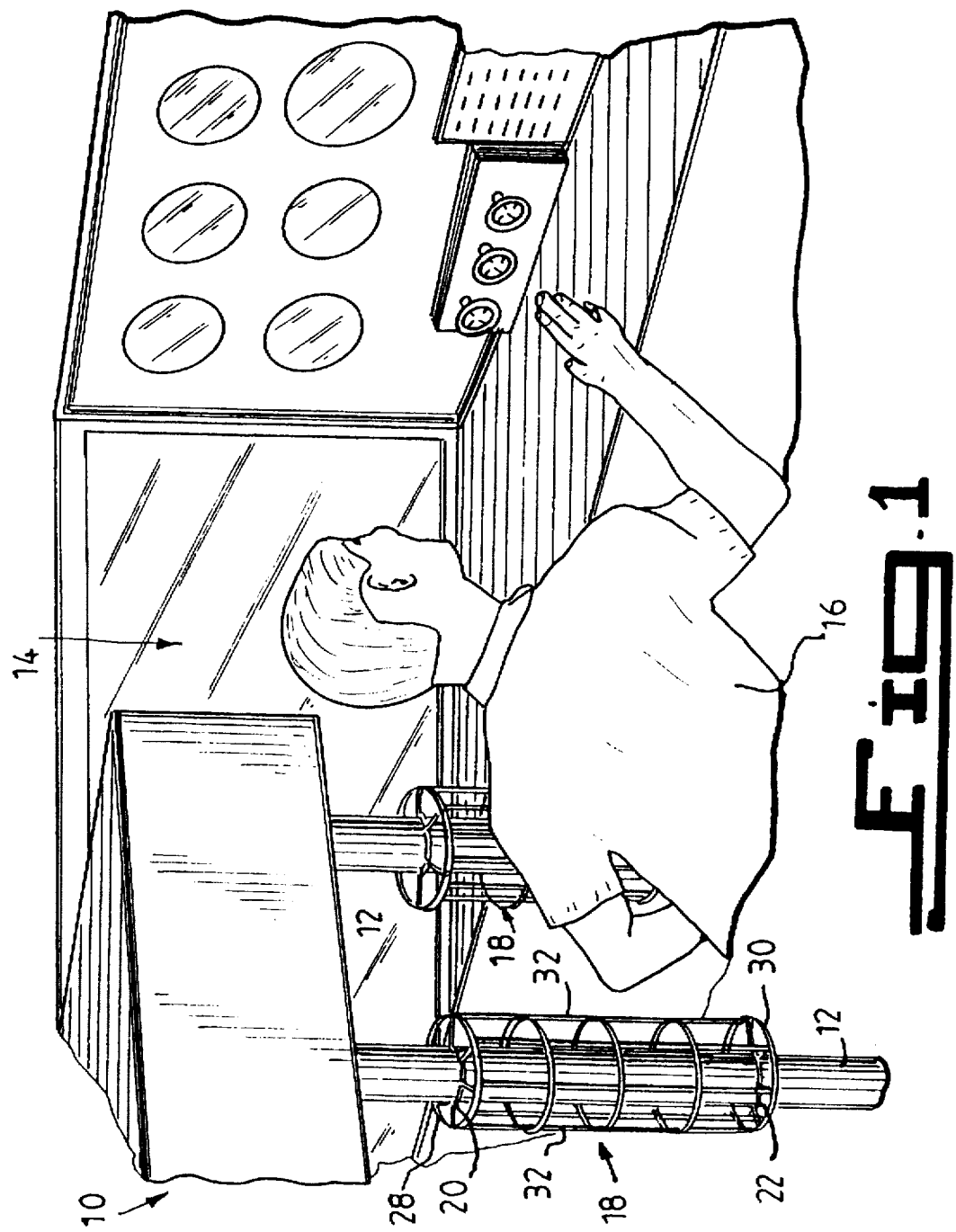
FIG. 1 is a perspective view of a control station at a processing facility implementing the pipe cage of the present invention around hot process pipes.
Figure 2:
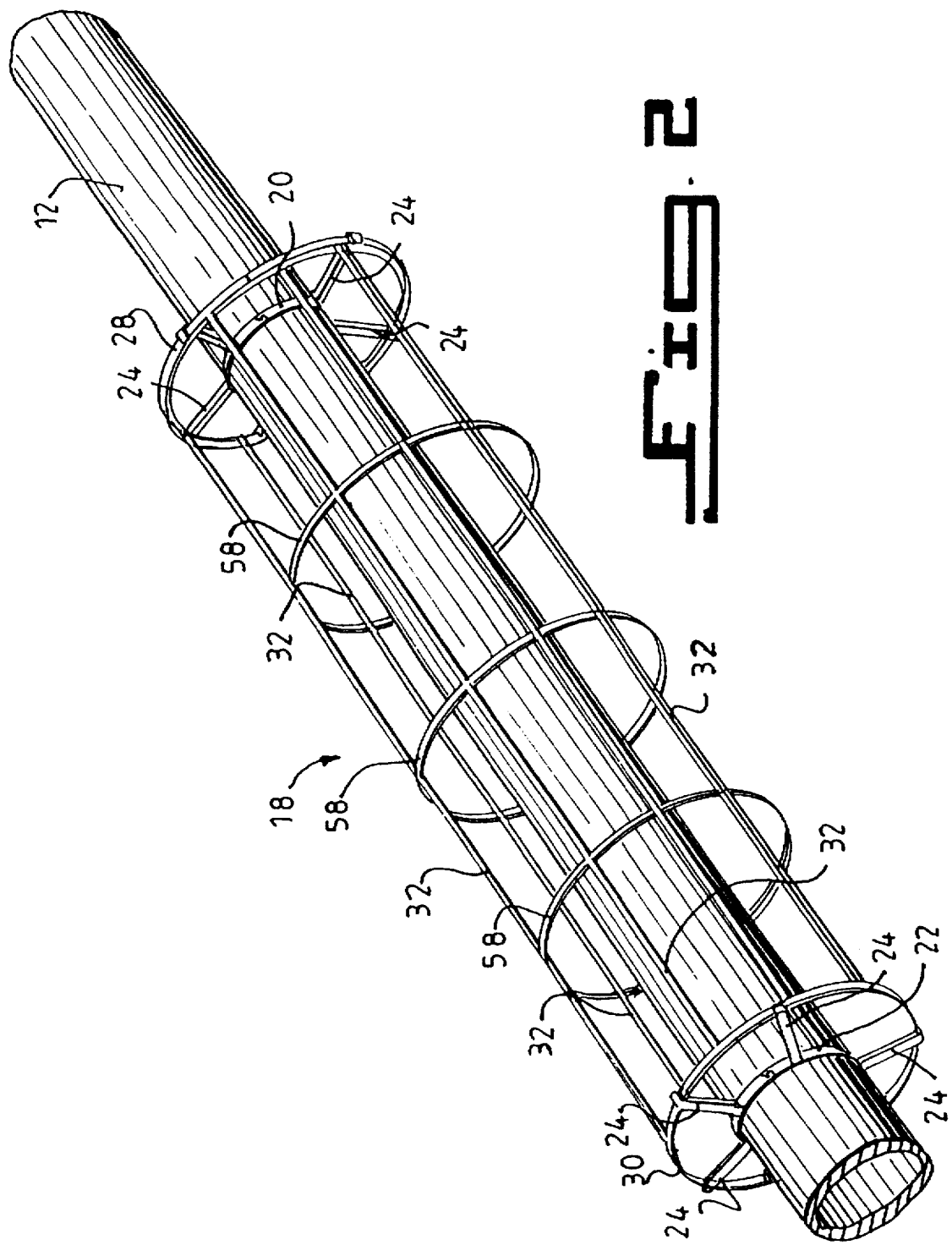
FIG. 2 is a perspective view of the pipe cage of the present invention positioned around a hot process pipe.
Figure 3:
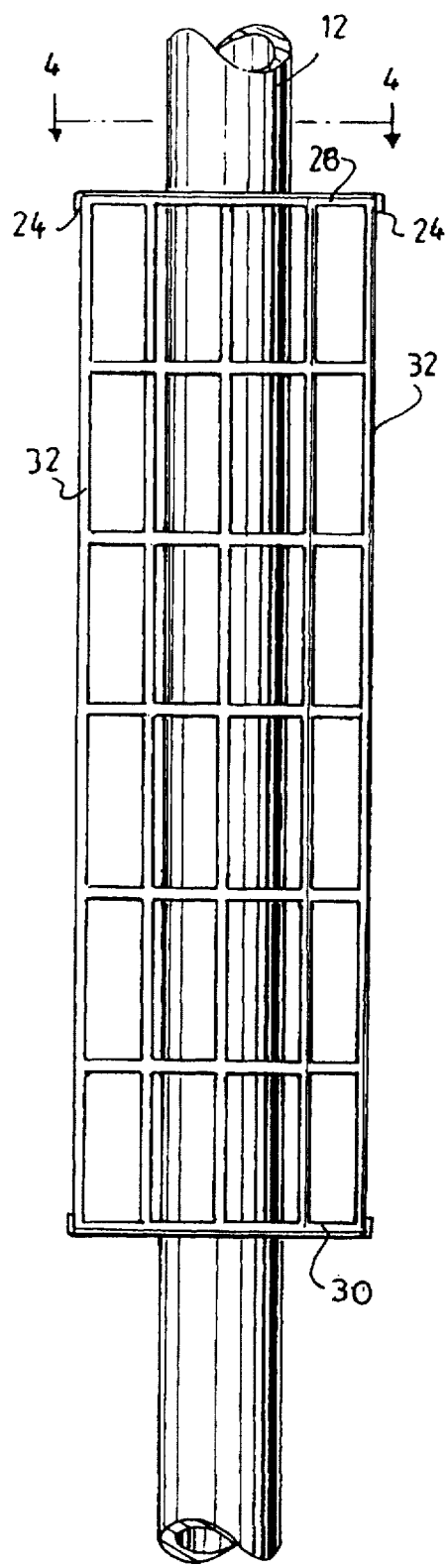
FIG. 3 is a side view of the pipe cage of the present invention positioned around a hot process pipe.
Figure 4:
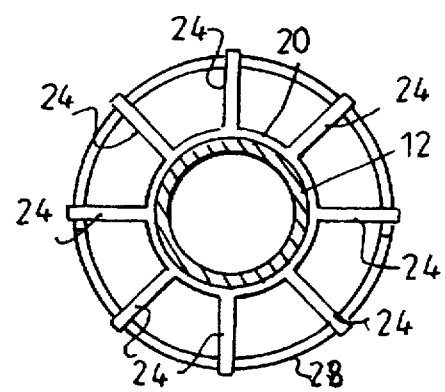
FIG. 4 is a top view of the pipe cage of the present invention taken in the direction of the arrow 4—4 of FIG. 3.

Turning now descriptively to the drawings, in which similar reference characters denote similar elements throughout the several views, the Figures illustrate scope mount for rifles and pistols of the present invention with regard to the reference numerals used, the following numbering is used throughout the various drawing figures.

10 processing plant
12 hot process pipe
14 control station
16 worker
18 pipe cage
20 first clip
22 second clip
24 first set of spacer bars
26 second set of spacer bars
28 first ring
30 second ring
32 plurality of ribs
34 first section of clip
36 first end of first section of clip
38 second end of first section of clip
40 receiving section of first end
42 receiving section of second end
44 second section of first clip
46 first end of second section
48 second end of second section
50 protruding nub on first end of second section
52 protruding nub on second end of second section
54 protruding end
56 clamping recess
58 additional rings

DETAILED DESCRIPTION OF THE PREFERRED EMBODIMENTS

Turning now descriptively to the drawings, in which similar reference characters denote similar elements throughout the several views, the figures illustrate a pipe cage used to surround hot process piping and process vessels. The pipe cage acts to protect persons from contacting the hot pipes without inhibiting the ambient air from naturally cooling the hot pipes. A processing plant implementing the pipe cage of the present invention is illustrated in FIG. 1 and indicated generally by the numeral 10.

The processing plant 10 includes a plurality of pipes 12 positioned in a control station or work area 14 thereof. The processing plant 10 may be a chemical plant, a manufacturing facility, a refinery or any other processing plant using hot processing pipes which run throughout occupied work areas where employees or other personnel 16 are present. Each pipe cage 18 of the present invention is positioned around a respective one of the pipes 12. The pipe cage 18 of the present invention is more clearly illustrated in FIGS. 2-6.

Each pipe cage 18 includes a first clip 20 and a second clip 22 which engage the hot process pipe 12. A first set of spacer bars 24 are connected at a first side thereof to extend from the first clip 20 and a second set of spacer bars 26 are connected at a first side thereof to extend from the second clip 22. Adjacent bars of each of the first and second sets of spacer bars 24 and 26 are preferably separated by forty-five (45) degrees about the circumference of their respective ring. Therefore, optimally there will be eight (8) spacer bars extending from each of the first and second clips 20 and 22 although any number of spacer bars may be connected to extend from each clip 20 and 22.

The first and second clips 20 and 22 may be made of any material which will prevent heat transfer from the pipe 12 to the cage 18. For lower temperature applications, the cage will preferably be made of a fiberglass ring or pad mounted to the surface of the pipe and having a thin gage metal cage fastened to the fiberglass ring or pad. The fiberglass ring or pad may be replaced by any other material which is able to perform the same function and the thin gage metal may be formed of galvanized steel, aluminum, any alloy thereof or any other metal which has the same or similar properties. For higher temperature applications, the clip will be made of steel mounted to the surface of the pipe 12 and having a ceramic material fastened thereto. The pipe cage 18 will then be fastened to the ceramic spacer layer.

A first ring 28 is connected to a second end of the first set of spacer bars 24 and a second ring 30 is connected to a second end of the second set of spacer bars 26. The first and second clips 20 and 22 each have a circumference equal to the circumference of the outer wall of the pipe 12 which they extend around. The circumference of the first ring 28 is equal to the circumference of the second ring 30, the circumference of the first and second rings 28 and 30 being greater than the circumference of the first and second clips 20 and 22.

Extending between the first and second rings 28 and 30 are a plurality of ribs 32 which extend parallel to the pipe 12. Optimally, adjacent ones of the plurality of ribs 32 will be separated by an approximately or substantially forty-five (45) degree arc along the radius of the first and second rings 28 and 30 and thus there will be eight ribs positioned about the cage. However, any number of ribs may be connected around the first and second rings and separated by any desired distance. The distance of separation between adjacent ribs need not be uniform about the circumference of the first and second rings 28 and 30. Thus accommodating any position of the pipes and providing added protection to areas of pipe having a greater likelihood of contact by a person in the area surrounding the pipe. The first and second rings 28 and 30 act to separate the plurality of parallel ribs 32 from the hot process pipe 12 and thereby shield the pipe 12 from contact by persons in the area while allowing the ambient air to naturally cool the pipe 12. Additional rings 58 may be connected to the plurality of the ribs 32 and positioned between the first and second rings 28 and 30 for adding further support to the plurality of ribs 32 and increasing the length of the pipe cage 18.

Figure 5:
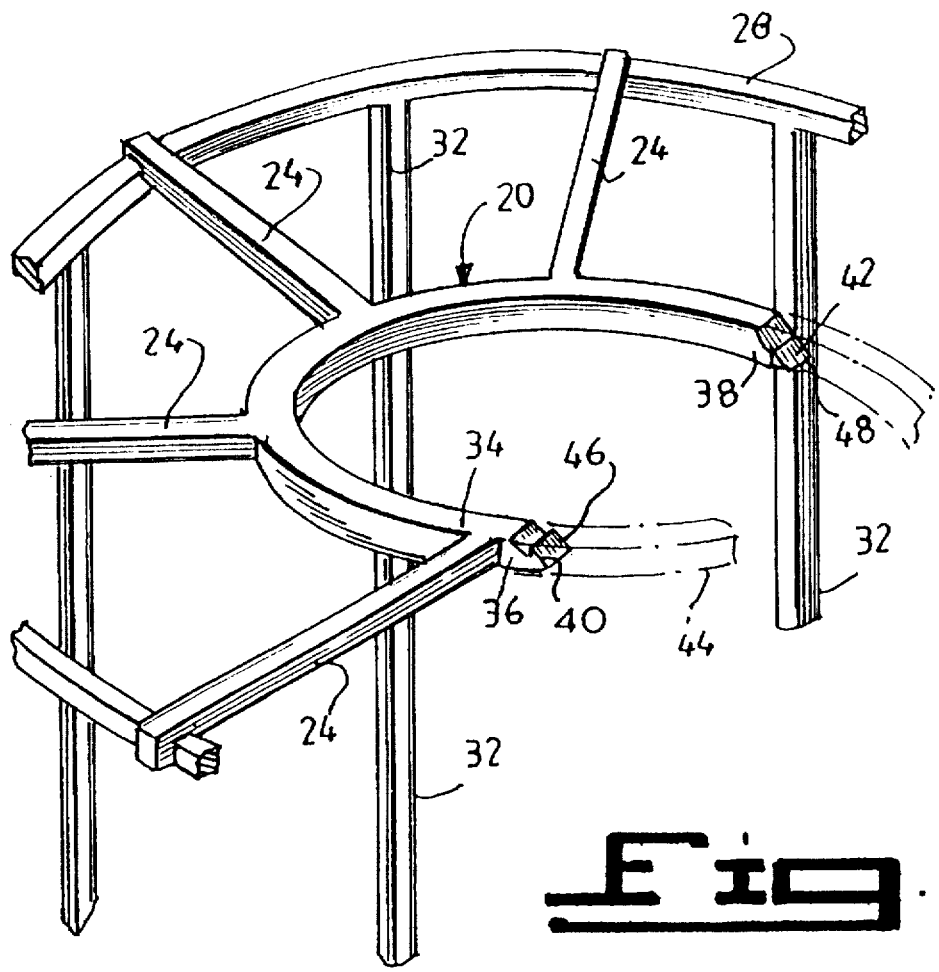
FIG. 5 is a top perspective view with parts broken away of a portion of the pipe cage of the present invention.

FIG. 5 illustrates a first section of the pipe cage 18. The first clip 20 includes first and second sections 34 and 44 which clip together for placement around the pipe 12. The first section 34 includes first and second ends 36 and 38, each including a receiving section 40 and 42. The second section 44 is shown in outline in FIG. 5 and includes first and second ends 46 and 48. The first and second ends 46 and 48 each include a protruding nub 50 and 52. The protruding nubs 50 and 52 are secured within a respective one of the receiving sections 40 and 42 to thereby connect the first and second sections 34 and 44.

Figure 6:
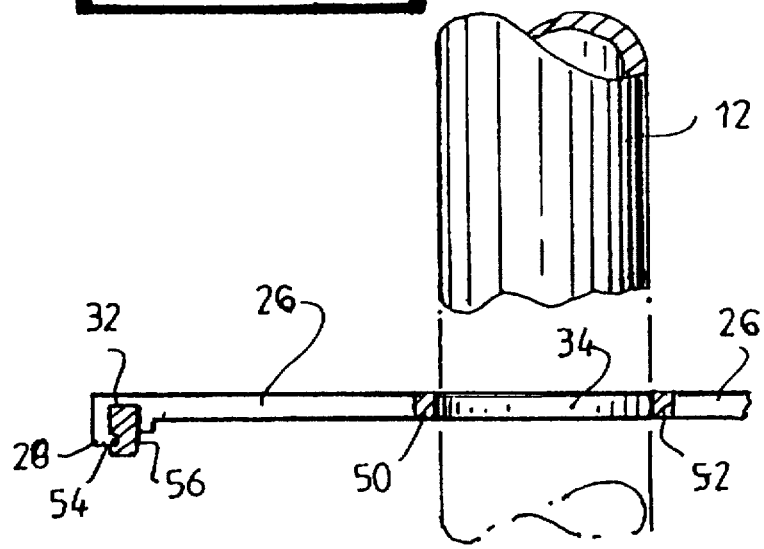
FIG. 6 is a side cross-sectional view of a portion of the pipe cage of the present invention.

FIG. 6 illustrates the connection between the first ring 26 and the parallel ribs 32. The first ring 26 includes a plurality of protruding clips 54 and each parallel rib 32 includes a recess 56 at either end thereof. The recess 56 on each of the plurality of ribs 32 are sized for receipt of a respective one of the protruding clips 54 on the first ring 26 to secure the ribs within the first ring 28. The protruding clips 54 are positioned about the periphery of the first ring 28 at points at which it is desired to connect with a rib 32. The second ring 30 includes corresponding protruding clips for connecting to the opposing side of the plurality of ribs 32.

It is to be understood that the pipe cage for protecting persons in proximity to a hot process pipe from contacting the pipe while allowing the ambient air to contact and cool the pipe in accordance with the present invention may be formed of any suitable material such as steel, iron, any alloy thereof, any alloy of a light weight casted metal or molded material, wood, plastic, or any combination of materials and the like and that the invention is not intended to be limited by the materials from which the pipe cage is formed.

The pipe cage of the present invention is also useful for placement around hot process vessels and tank bottoms, acting to protect persons in the vicinity while maintaining exposure to the surrounding environment.

Based on the above, it is evident that the present invention is to provide a pipe cage that will overcome the shortcomings of the prior art devices which protects persons from contact with hot process piping and process vessels while maintaining exposure of the hot process piping and process vessels to the atmosphere. The present invention also allows ambient air to cool the hot process piping and process vessels which increases the efficiency and production of hot process piping and process vessels. The pipe cage of the present invention allows easy access for maintenance on the hot process piping and process vessels and is easily installed. Furthermore, the present invention is inexpensive in cost and easy to manufacture.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A pipe cage for protecting persons from a hot process pipe, said pipe cage comprising:
   a) first and second clips each engaging the hot process pipe, said first and second clips being separated by a predetermined distance along a length of the hot process pipe;
   b) first and second sets of spacer bars, each spacer bar of both said first and second sets having first and second ends and being connected at said first end to extend from a respective one of said first and second clips;
   c) a first ring connected to the second side of each bar of said first set of bars;
   d) a second ring connected to said second side of each bar of said second set of bars; and
   e) a plurality of ribs each having a length equal to said predetermined separation distance and connected between said first and second rings, wherein said plurality of ribs are spaced from and extend parallel to the hot process pipe preventing contact of the hot process pipe by a person in an area surrounding the pipe while providing ambient air exposure to the hot process pipe.

2. A pipe cage as recited in claim 1, wherein both said first and second clips include first and second sections, said first section of both said first and second clips include first and second ends each having a clamping recesses and said second section of both said first and second clips include first and second ends including nubs for receipt by said first and second clamping recesses.

3. A pipe cage as recited in claim 1, wherein both said first and second clips include first and second sections, said first section of both said first and second clips include a first end having a clamping recess and said second section of both said first and second clips include a first end including a nub for receipt by said first and second clamping recesses, said first and second sections of both said first and second clips each including a second end and being pivotally connected at said second ends.

4. A pipe cage as recited in claim 1, wherein said first and second rings each include a plurality of clamping recesses and said plurality of ribs each include first and second protruding ends, each of said first and second protruding ends including a nub for receipt by a respective clamping recess in said first and second rings.

5. A pipe cage as recited in claim 1, wherein said first and second rings each have a circumference and adjacent ones of said plurality of ribs are separated by a substantially 45 degree arc about said circumference of said first and second rings.

6. A pipe cage as recited in claim 1, wherein said first and second clips include a fiberglass ring and a metal ring fastened therearound.

7. A pipe cage as recited in claim 6, wherein said metal is one of galvanized steel, aluminum, iron, any alloy thereof and any combination thereof.

8. A pipe cage as recited in claim 1, wherein said first and second clips include a steel ring and a ceramic spacer layer fastened therearound.

9. A pipe cage as recited in claim 1, further comprising a plurality of intermediate rings positioned between said first and second rings and connected to said plurality of ribs.

10. A pipe cage as recited in claim 1, wherein said first and second sets of spacer bars and said plurality of ribs are made of a low conductive material.

11. A pipe cage as recited in claim 1, wherein said first and second sets of spacer bars and said plurality of ribs are made of any one of steel, iron, any alloy thereof, any alloy of a light weight casted metal or molded material, wood, plastic, and any combination of materials.

\* \* \* \* \*